United States Patent [19]

Morrow

[11] Patent Number: 5,324,036
[45] Date of Patent: Jun. 28, 1994

[54] VIDEO GAME CONSOLE

[76] Inventor: Ezra J. Morrow, 11710 Evanston, Detroit, Mich. 48213

[21] Appl. No.: 141,388

[22] Filed: Oct. 22, 1993

[51] Int. Cl.⁵ .................. A63F 9/22; A47B 63/00
[52] U.S. Cl. .................. 273/148 B; 273/148 R; 273/434; 273/309; 312/223.3
[58] Field of Search ............... 273/148 R, 148 B, 309, 273/438, 434, DIG. 28; 312/223.2, 223.3, 9.1

[56] References Cited

U.S. PATENT DOCUMENTS

| | | | |
|---|---|---|---|
| D. 276,963 | 1/1985 | Ameduri | 273/148 B |
| D. 285,759 | 9/1986 | Wright | |
| 3,837,720 | 9/1974 | Boris et al. | 273/148 B |
| 4,394,055 | 7/1983 | Smith | 312/196 |
| 4,397,509 | 8/1983 | Miller et al. | 273/148 B |
| 4,521,014 | 6/1985 | Sitrick | 273/434 |
| 4,695,903 | 9/1987 | Serap et al. | 273/DIG. 28 X |
| 5,106,091 | 4/1992 | Comito | 273/142 H |
| 5,114,157 | 5/1992 | Kita | 273/434 |
| 5,221,083 | 6/1993 | Dote | 273/85 CP |

Primary Examiner—Jessica J. Harrison
Assistant Examiner—Kerry Owens
Attorney, Agent, or Firm—Peter D. Keefe

[57] ABSTRACT

A video game console composed of a console having an inclined table top and a set of length adjustable legs connected with the console. The console includes covered compartments for holding video game cartridges, a covered central processing unit compartment, and recessed hand controller receptacles. The console includes a hingably connected table top panel which allows the user access to the interior of the console for the purposes of connecting the hand controllers to respective recessed hand controller receptacles and for effecting wiring adjustments. It is preferred to provide auxiliary hand controller openings in a front panel of the console. It is further preferred to include a bank of switches on the front panel of the console for a user to conveniently select which of the hand controllers is presently operative. Preferably, the wiring running exterior of the console is reelably regulated by each being wound, respectively, on a spring loaded recoil reel. Preferably, the console is constructed of a light weight, durable and structurally strong plastic material.

22 Claims, 2 Drawing Sheets

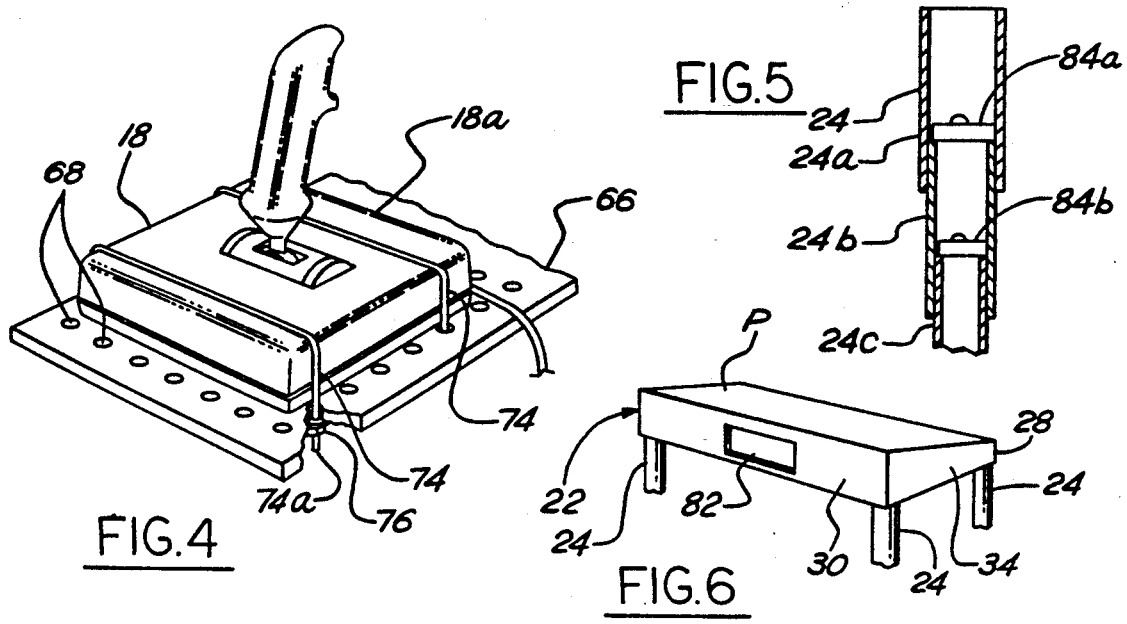
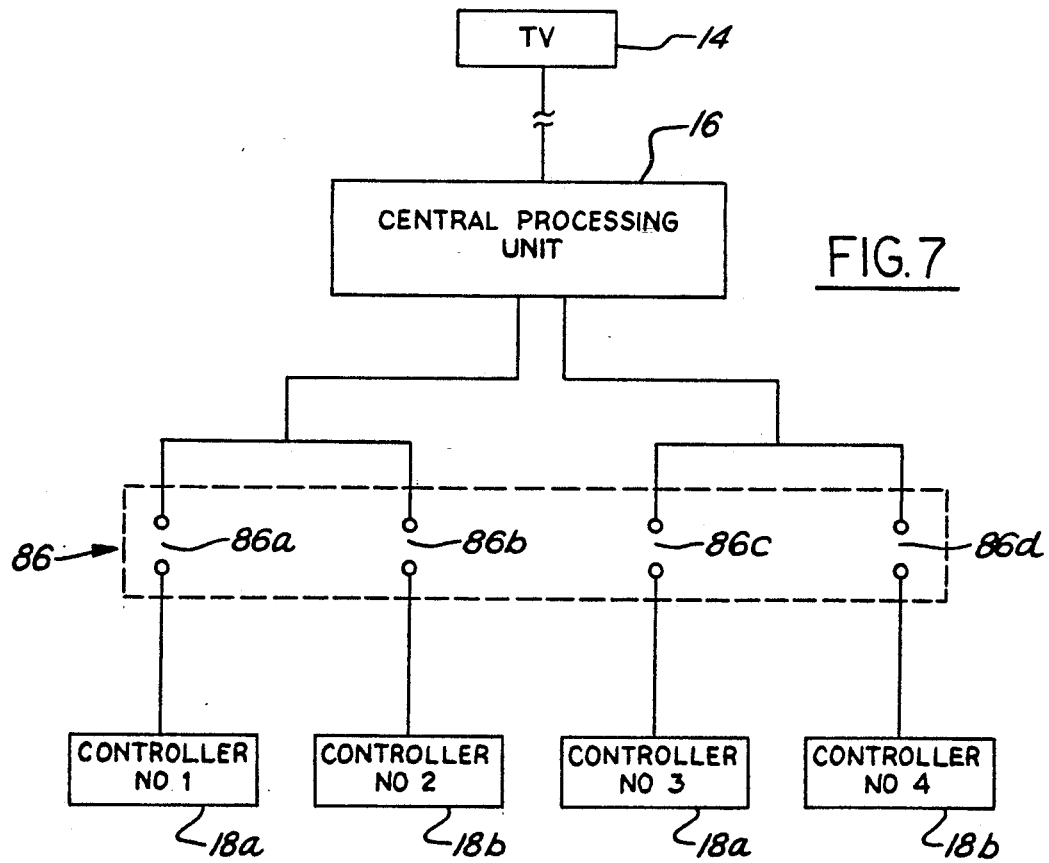

VIDEO GAME CONSOLE

BACKGROUND OF THE INVENTION

1. Field of the Invention

The present invention relates to video game units, particularly video game units used in home environments, and more particularly to a console specifically configured to facilitate playing video games via a video game unit.

2. Description of the Prior Art

Video game units have become extremely popular. These units generally include a central processing unit in which any one of a various number of game cartridges is inserted thereinto and via which television signals are generated for display in the form of audio and video at an adjacent television. These units further include one or more hand controllers which are connected with the central processing unit for a user to control play of the selected video game.

While the enjoyment of video games is well known, the enjoyment thereof is somewhat reduced by the limitation that the hand controllers are free to move about. This limitation arises because the video game units sold for home use are configured as stand alone systems, yet the hand controller is most effectively utilized if it is anchored to some immovable object, as is the case in coin-operated commercial video game units. Further, there is the associated problem of convenient storage of the game cartridges, storage of the central processing unit and its connected hand controllers, as well as neat placement of the associated wiring.

Accordingly, what remains needed in the art is a console which effects to provide convenient storage for game cartridges, the central processing unit, convenient placement of the hand controllers and neat concealment of the associated wiring, and which further provides an anchorage for at least some of the connected hand controllers.

SUMMARY OF THE INVENTION

The present invention is a console which effects to provide convenient placement and storage of the components of a video game unit, where the game cartridges, the central processing unit, and the hand controllers are conveniently located, and wherein the associated wiring is neatly concealed, and further wherein anchorage is provided for at least some of the connected hand controllers.

The video game console according to the present invention is composed generally of a console having an inclined table top and a set of length adjustable legs connected with the console. More specifically, the console includes covered compartments for holding video game cartridges, a covered central processing unit compartment, and recessed hand controller receptacles. The console includes a hingably connected table top panel which allows the user access to the interior of the console for the purposes of connecting the hand controllers to respective recessed hand controller receptacles and for effecting wiring adjustments. It is preferred to provide auxiliary hand controller openings in a front panel of the console. It is further preferred to include a bank of switches on the front panel of the console for a user to conveniently select which of the hand controllers is presently operative. Preferably, the wiring running exterior of the console is reelably regulated by each being wound, respectively, on a spring loaded recoil reel. Preferably, the console is constructed of a light weight, durable and structurally strong plastic material.

Accordingly, it is an object of the present invention to provide a video game console which is structured to provide storage of the components of a video game unit, and further provide anchorage for selected hand controllers of the video game unit.

It is an additional object of the present invention to provide a video game console which is structured to provide storage of the components of a video game unit, and further provide anchorage for selected hand controllers of the video game unit, and still further provide user selectable switching of the active the hand controllers.

It is another object of the present invention to provide a video game console which is structured to provide storage of the components of a video game unit, and further provide anchorage for selected hand controllers of the video game unit, and still further provide convenient storage of game cartridges.

It is a further object of the present invention to provide a video game console which is structured to provide storage of the components of a video game unit, and further provide anchorage for selected hand controllers of the video game unit, and still further provide reelable storage of wiring external to the video game console.

It is still another object of the present invention to provide a video game console which is structured to provide storage of the components of a video game unit, and further provide anchorage for selected hand controllers of the video game unit, wherein the video game console is attractive, functional, lightweight, durable and inexpensive.

These, and additional objects, advantages, features and benefits of the present invention will become apparent from the following specification.

BRIEF DESCRIPTION OF THE DRAWINGS

FIG. 4 is a detail perspective view of a recessed hand controller receptacle according to the present invention, shown in operation with a hand controller.

FIG. 5 is a detail partly sectional side view of a leg according to the present invention, showing a preferred length adjustment feature thereof.

FIG. 6 is a rear perspective view of the video game console according to the present invention.

FIG. 7 is a schematic electrical diagram for connecting the switch bank of the video game console according to the present invention to hand controllers and the central processing unit of a video game unit, as well as for connecting a television to the central processing unit.

DETAILED DESCRIPTION OF THE PREFERRED EMBODIMENT

Figure 1:
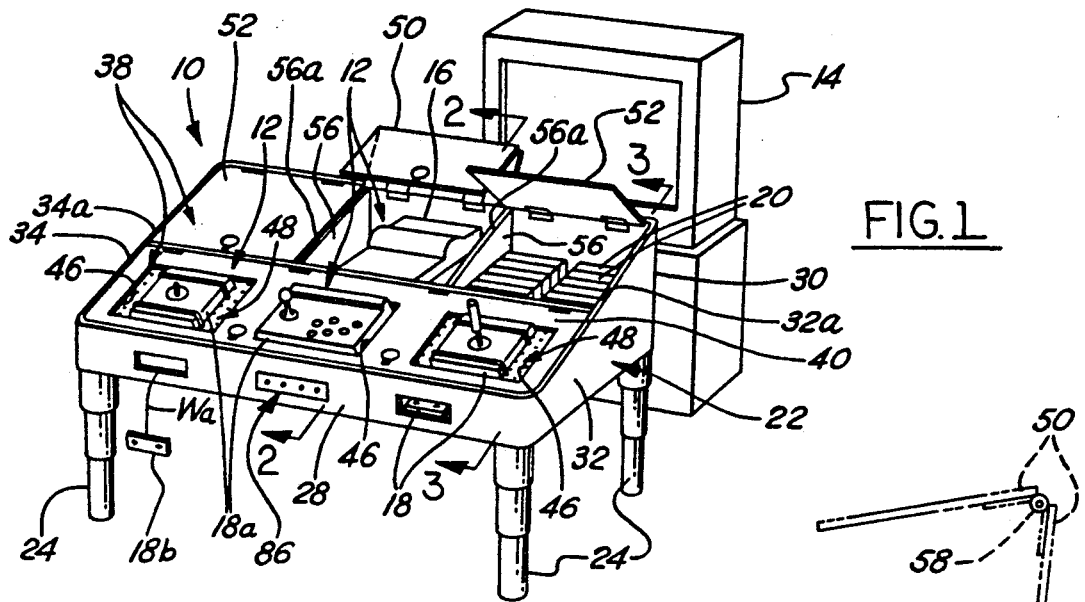
FIG. 1 is a perspective view of the video game console according to the present invention, shown in operation with respect to a video game unit and an adjacent television.
Figure 2:
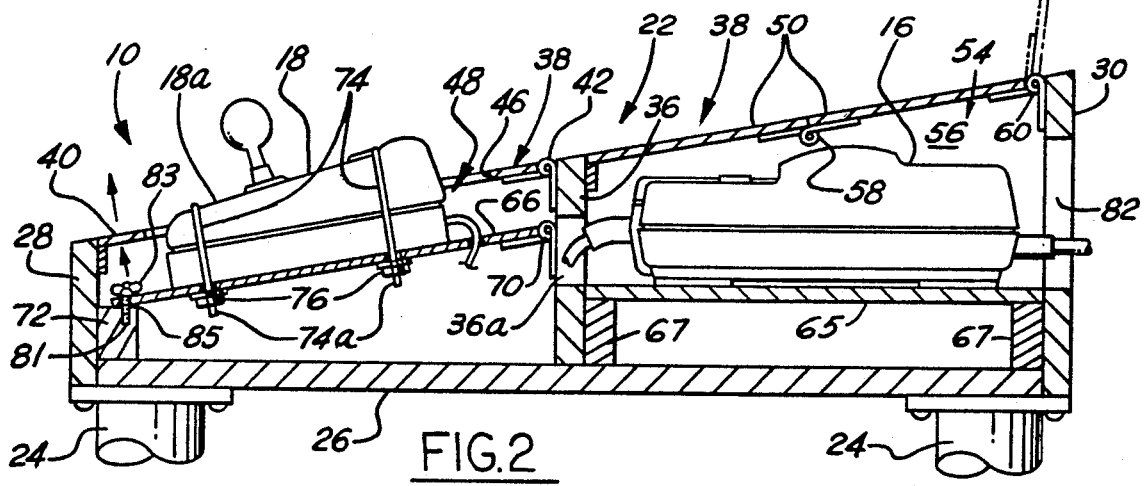
FIG. 2 is a partly sectional side view of the video game console, shown along line 2—2 in FIG. 1.
Figure 3:
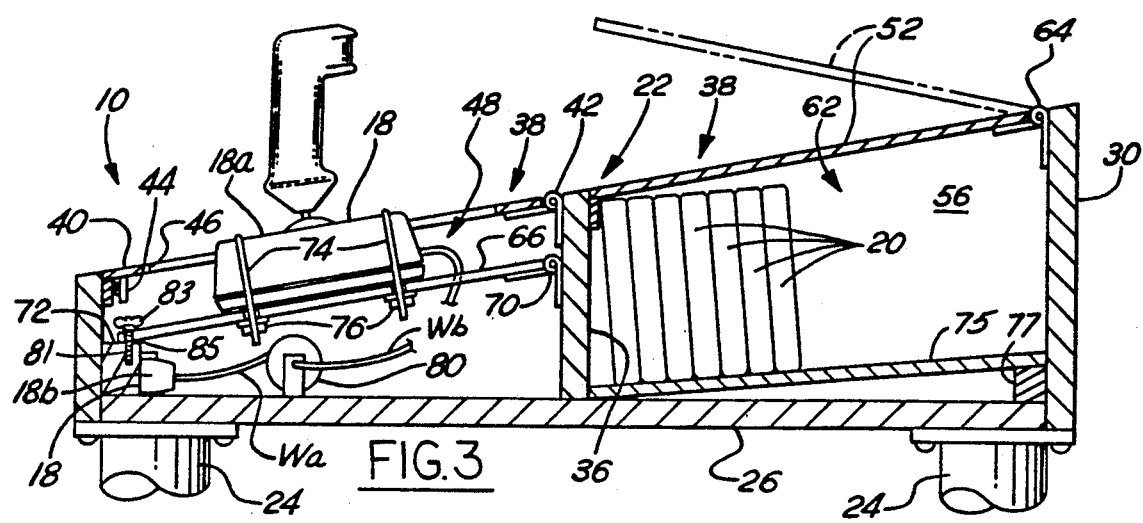
FIG. 3 is a partly sectional side view of the video game console, shown along line 3—3 in FIG. 1.

Referring now to the Drawing, FIG. 1 shows the video game console 10 according to the present invention in operation with respect to a video game unit 12 and a television 14. The video game unit 12 includes a central processing unit 16 and one or more hand controllers 18, usually at least two in number and preferably four or more in number, wherein some of which may be anchored hand controllers 18a and some may be hand-held hand controllers 18b, as will be elaborated hereinbelow. The central processing unit 16 is structured to receive a video game cartridge 20 selected from a number of various video game cartridges, each of which providing software for a particular video game operative via the central processing unit 16 for being displayed in terms of audio and video on the television 14, and played via one or more of the hand controllers 18. The video game console 10 is composed generally of a console 22 having legs 24 depending therefrom which are preferably adjustable in length. The structure and function of the video game console 10 will now be detailed with greater particularity with reference being additionally had to FIGS. 2 through 7.

The console 22 is provided with a base 26 to which the legs 24 are connected. In this regard, preferably each leg 24 is located adjacent a respective corner of the base 26. Connected substantially perpendicularly with respect to the base 26 is a front panel 28, an opposite rear panel 30 and right and left side panels 32, 34. The front panel 28 has a height that is shorter than that of the rear panel 30, on the order of one-half, and the height of the right and left side panels varies smoothly between the height of the front panel and the height of the rear panel. The top edges 32a, 34a of the right and left side panels define a plane P (see FIG. 6) in which a table top 38 of the console 22 is located. Preferably, the front panel 28, the rear panel 30, the right side panel 32 and the left side panel 34 are mutually integrally connected, with the corners formed thereby being rounded, as shown generally in FIG. 1. Approximately equidistant between, and oriented parallel with, the front and rear panels 28, 30 is located a partition wall 36 which is connected with at least one of the right and left side panels 32, 34 and the base 26. The height of the partition wall 36 is selected so that it extends between the base 26 and the plane P. The partition wall 36 includes a wiring aperture 36a (see FIG. 2).

The table top 38 is in part composed of a table top panel 40 extending from the front panel 28 to the partition wall 36, and from the right side pan el 32 to the left side pan el 34. The table top panel 40 is hingably connected with the partition wall 36 by hinges 42 and is snappably connected with the front panel 28 by snaps 44. The table top panel 40 is provided with one or more (three being shown in the Drawing) apertures 46. The apertures 46 define the location of recessed hand controller receptacles 48, which will be detailed hereinbelow.

The table top 38 is further defined by covers 50, 52 which are hingably connected with the rear panel 30 and which extend therefrom to the partition wall 36. In this regard, a central processing unit compartment cover 50 is provided which covers a central processing unit compartment 54. The central processing unit compartment 54 is demarcated by a first bottom 65 supported above the base 26 by blocks 67, the rear panel 30, the partition wall 36, and a pair of interior walls 56 that run between, and are connected with, the rear panel 30 and the partition wall 36. The interior walls 56 are provided with upper edges 56a which are in the plane P. The central processing unit compartment cover 50 is preferably of bi-fold construction via a hinge 58. The central processing unit compartment cover 50 is connected by hinges 60 to the rear panel 30. On either side of the central processing unit compartment cover 50 is located a video game cartridge storage compartment cover 52. Each video game cartridge storage compartment cover 52 covers a video game cartridge storage compartment 62. Each video game cartridge storage compartment 62 is defined by a respective interior wall 56, the rear panel 30, the partition wall 36, one of the right or left side panels 32, 34, respectively, and, also a respective second bottom 75 which is angled parallel with plane P. The orientation of the second bottom 75 is defined by a block 77 located at only one end thereof which spaces that end away from the base 26. The cartridge covers 52 are connected with the rear panel 30 by hinges 64. The central processing unit compartment 54 is structured to accommodate the central processing unit 16, and the video game cartridge storage compartments 62 are structured to hold a number of video game cartridges and/or other items related generally to the video game unit 12.

Each of the recessed hand controller receptacles 48 is characterized by a floor 66 located below the table top panel 40 at each of the apertures 46. Each floor 66 has a plurality of perforations 68, distributed preferably in the uniformly spaced manner of a conventional peg board. Each floor 66 is connected at one end by a hinge 70 to the partition wall 36; the other end thereof rests upon an abutment 72 adjacent the front panel 28. In this regard with respect to each floor 66, a pair of threaded studs 81 extend from the abutment 72 and each passes through a respective hole 85 in the floor. Wing nuts 83 are threaded onto the studs 81 to secure the floor affixedly with respect to the console 22, yet they are easily unthreaded to allow a user to thereupon pivot the floor on the hinge 70. U-shaped brackets 74 are utilized to clampably engage with respect to an anchored hand controller 18a. In this regard, the U-shaped brackets 74 pass through selected perforations 68, wherein each end portion 74a of the U-shaped bracket is threaded so that nuts 76 threaded thereonto affix the U-shaped bracket securely to the floor 66 to thereby affix the anchored hand controller 18a to the console 22. With the wing nuts 83 unthreaded, the hinges 70 allow the floor to be pivoted so that a user can make adjustments with respect to the hand controllers and their associated wiring. Preferably two mutually spaced apart U-shaped brackets 74 are used with respect to each anchored hand controller 18a.

Preferably, the front panel 28 of the console 22 is provided with openings 78 for receiving hand-held hand controllers 18b. The hand-held hand controllers 18b preferably have wiring which is wound upon a spring loaded reel 80. Conventional spring loaded reels which are commercially available are used for electrical extension cords. Conventional spring loaded reels allow selected amounts of a first portion of an extension cord to be unreeled, then this amount is set by one or more first tugs thereon to set an internal reel stop mechanism, while another tug or more on the extension cord causes the internal reel stop mechanism to release and the spring thereupon causes the reel to wind in the extension cord. A commutator is provided therewithin at the sidewall of the conventional spring loaded reel so that the first portion of the extension cord is reeled, while a second portion of the extension cord is static. The spring loaded reel 80 reels a first portion of wire Wa connected with the hand-held hand controller, while a second portion of the wire Wb is static. The commutator of the spring loaded reel 80 has separate provision for each electrical wire constituent of the wires Wa, Wb, typically being seven in number. As in the conventional spring loaded reel, this provision involves a separate metallic ring connected with the sidewall of the spring loaded reel 80 for each electrical wire of wire Wb, and a separate brush, contacting a respective metallic ring, for each electrical wire of wire Wa. The spring loaded reel 80 and its associated hand-held hand controller would be provided as a unit, possibly as an option. The spring loaded reel 80 is mounted to the base 26 (see FIG. 3).

As can be seen in FIG. 6, an opening 82 is provided in the rear panel 30 for wires to connect between the central processing unit 16 and the television 14. Optionally, the wiring between the television 14 and the central processing unit 16 may be reelably regulated as discussed hereinabove with respect to the hand-held hand controllers 18b.

It is preferred for the panel, wall and cover components of the console 22 to be composed of a durable, structurally strong and light weight plastic material.

FIG. 5 details a preferred example of how the legs 24 are adjustable in length. In this regard, three leg components 24a, 24b and 24c are mutually telescopic and held at a selected position by an offset cam 84a, 84b operated by rotation of a selected leg component with respect to its telescopically adjacent leg component. This leg adjustment structure has long been used for tent poles. Other leg known adjustment mechanisms are also acceptable for use with the legs 24.

FIG. 7 depicts a schematic electrical diagram for effecting selection of which of the hand controllers 18 is to be active for playing a particular video game with the central processing unit 16, and displayed on the television 14. In this regard, preferably a switch bank 86, having one switch, respectively, for each hand controller 18, is provided on the front panel 28, via which a user can select which hand controller is to be operative. In the example depicted, there are four hand controllers 18 (two of which are anchored hand controllers 18a and two of which are hand-held hand controllers 18b). One or two hand controllers 18 are operable at any one time. Accordingly, there are four switches 86a, 86b, 86c, and 86d in the switch bank 86.

In operation, a user lifts the central processing unit cover, places the central processing unit 16 of the video game unit 12 into the central processing unit compartment, then lowers the central processing unit cover cover. The user then wires the central processing unit to the television 14. The user then uses the U-shaped brackets 74 to secure hand controllers 18a anchorably to respective floors. The user then connects the wires of the hand controllers to the central processing unit, optionally through the switch bank 86. The user then affixes the floors to the console via the wing nuts. The user places the various video game cartridges in one or both of the cartridge compartments. The user is now ready to enjoyably play a selected video game with the aid of the video game console 10.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A video game console for use with playing a video game unit, said video game console comprising:
   a console comprising:
      a base;
      a front panel abutting said base, said front panel having a first height;
      a rear panel abutting said base, said rear panel having a second height, said second height being greater than said first height, a plane being defined by said front and rear panel heights;
      a right side panel abutting said base, said right side panel extending from said front panel to said rear panel, said right side panel having a top edge that lies substantially in said plane;
      a left side panel abutting said base, said left side panel extending from said front panel to said rear panel, said left side panel having a top edge that lies substantially in said plane;
      a partition wall extending substantially between said right and left side walls, said partition wall being located between said front and rear panels and being oriented parallel thereto, said partition wall having a height defined by said plane at said location of said partition wall;
   a table top located substantially at said plane, said table top comprising a table top panel extending between said partition wall and said front panel and further extending between said right and left side panels, said table top panel being hingably connected to said partition wall, said table top panel being provided with at least one aperture;
   a recessed hand controller receptacle located at each aperture of said at least one aperture, said recessed hand controller receptacle comprising:
      a floor having a first end and a second end, said first end of said floor being hingably connected with said partition wall, said second end of said floor being releasably affixed with respect to said base;
      means for releasably affixing said second end of said floor with respect to said base; and
      means for affixing a hand controller of the video game unit to the floor, wherein said hand controller extends from said floor through said aperture for enabling a user to graspably use the hand controller; and
   a central processing unit compartment located between said partition wall and said rear wall for receiving the central processing unit of the video game; and
   leg means connected with said console for supporting said console at a predetermined height above a floor.

2. The video game console of claim 1, further comprising at least one video game cartridge storage compartment located between said partition wall and said rear wall, and further located adjacent said central processing unit compartment.

3. The video game console of claim 2, wherein said at least one video game cartridge storage unit comprises:
   a first video game cartridge compartment located between said right side panel and said central processing unit compartment; and
   a second video game cartridge compartment located between said left side panel and said central processing unit compartment.

4. The video game console of claim 3, wherein said table top further comprises:

a central processing unit cover hingably connected with said rear panel for covering said central processing unit compartment;

a first video game cartridge storage compartment cover hingably connected with said rear panel for covering said first video game cartridge storage compartment; and a second video game cartridge storage compartment cover hingably connected with said rear panel for covering said second video game cartridge storage compartment.

5. The video game console of claim 4, wherein said central processing unit cover has a bi-fold construction.

6. The video game unit of claim 4, further comprising length adjustment means connected with said leg means for providing user adjustment of said predetermined height.

7. The video game unit of claim 6, wherein said floor of said recessed hand controller receptacle is provided with a plurality of spaced apertures; wherein further said means for affixing a hand controller to said floor comprises a pair of U-shaped brackets, each U-shaped bracket having threaded ends which insert through respective apertures in said floor, said U-shaped brackets having a predetermined dimension to capture the hand controller when said threaded ends thereof are inserted through the respective apertures; and wherein a nut threadably engages each said threaded end to thereby affix the U-shaped brackets and the hand controller with respect to the floor.

8. The video game unit of claim 7, further comprising at least one opening in said front panel for receiving therein a hand-held hand controller of the video game unit.

9. The video game unit of claim 8, wherein said means for releasably affixing said second end of said floor with respect to said base comprises:

an abutment affixed with respect to said base for abuttably receiving said second end of said floor;

at least one threaded stud connected with said abutment;

at least one aperture adjacent said second end of said floor for receiving said at least one stud when said floor abuts said abutment; and nut means for threadably engaging said at least one stud to thereby affix said second end of said floor with respect to said abutment.

10. The video game unit of claim 9, further comprising switch means connected with said front panel for providing user selection of activation of hand controllers of the video game.

11. The video game unit of claim 10, further comprising reel means connected with said console for reelably regulating movement of a wire of selected hand-held hand controllers of the video game unit with respect to said console.

12. The video game console of claim 11, wherein said central processing unit cover has a bi-fold construction.

13. The video game console of claim 12, wherein each of said first and second video game cartridge compartments is provided with a bottom affixed with respect to said base, wherein each said bottom is oriented substantially parallel with respect to said plane.

14. The video game unit of claim 13, wherein said at least one aperture in said table top panel comprises at least two mutually spaced apart apertures.

15. The video game unit of claim 14, further comprising second reel means connected with said console for reelably regulating movement of a wire of the central processing unit of the video game with respect to said console.

16. The video game unit of claim 1, further comprising at least one opening in said front panel for receiving therein a hand-held hand controller of the video game unit.

17. The video game unit of claim 16, further comprising reel means connected with said console for reelably regulating movement of a wire of selected hand-held hand controllers of the video game unit with respect to said console.

18. The video game unit of claim 1, further comprising length adjustment means connected with said leg means for providing user adjustment of said predetermined height.

19. The video game unit of claim 1, wherein said floor of said recessed hand controller receptacle is provided with a plurality of spaced apertures; wherein further said means for affixing a hand controller to said floor comprises a pair of U-shaped brackets, each U-shaped bracket having threaded ends which insert through respective apertures in said floor, said U-shaped brackets having a predetermined dimension to capture the hand controller when said threaded ends thereof are inserted through the respective apertures; and wherein a nut threadably engages each said threaded end to thereby affix the U-shaped brackets and the hand controller with respect to the floor.

20. The video game unit of claim 19, wherein said means for releasably affixing said second end of said floor with respect to said base comprises:

an abutment affixed with respect to said base for abuttably receiving said second end of said floor;

at least one threaded stud connected with said abutment;

at least one aperture adjacent said second end of said floor for receiving said at least one stud when said floor abuts said abutment; and nut means for threadably engaging said at least one stud to thereby affix said second end of said floor with respect to said abutment.

21. The video game unit of claim 1, further comprising switch means connected with said front panel for providing user selection of activation of hand controllers of the video game.

22. The video game unit of claim 1, further comprising reel means connected with said console for reelably regulating movement of a wire of the central processing unit of the video game with respect to said console.

* * * * *